Nov. 8, 1938.                H. G. GENTRY                2,136,293
                       INTERNAL COMBUSTION ENGINE
                         Filed Nov. 23, 1936         2 Sheets-Sheet 1
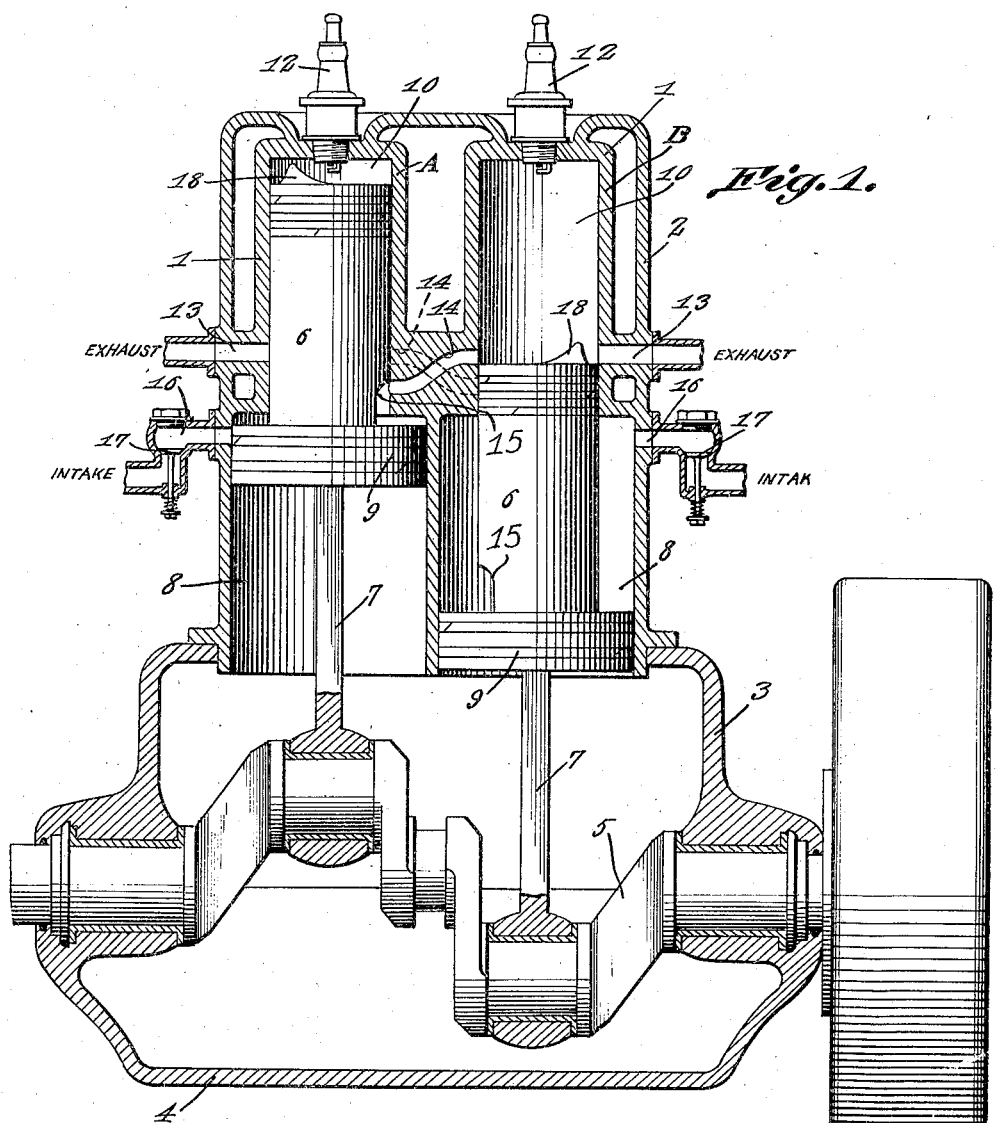
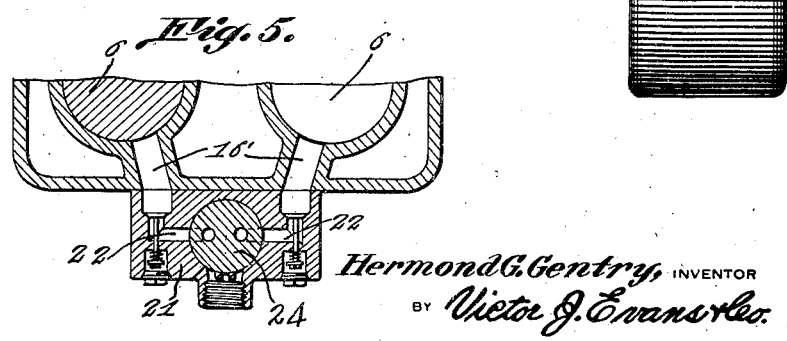

Nov. 8, 1938.  H. G. GENTRY  2,136,293
INTERNAL COMBUSTION ENGINE
Filed Nov. 23, 1936  2 Sheets-Sheet 2
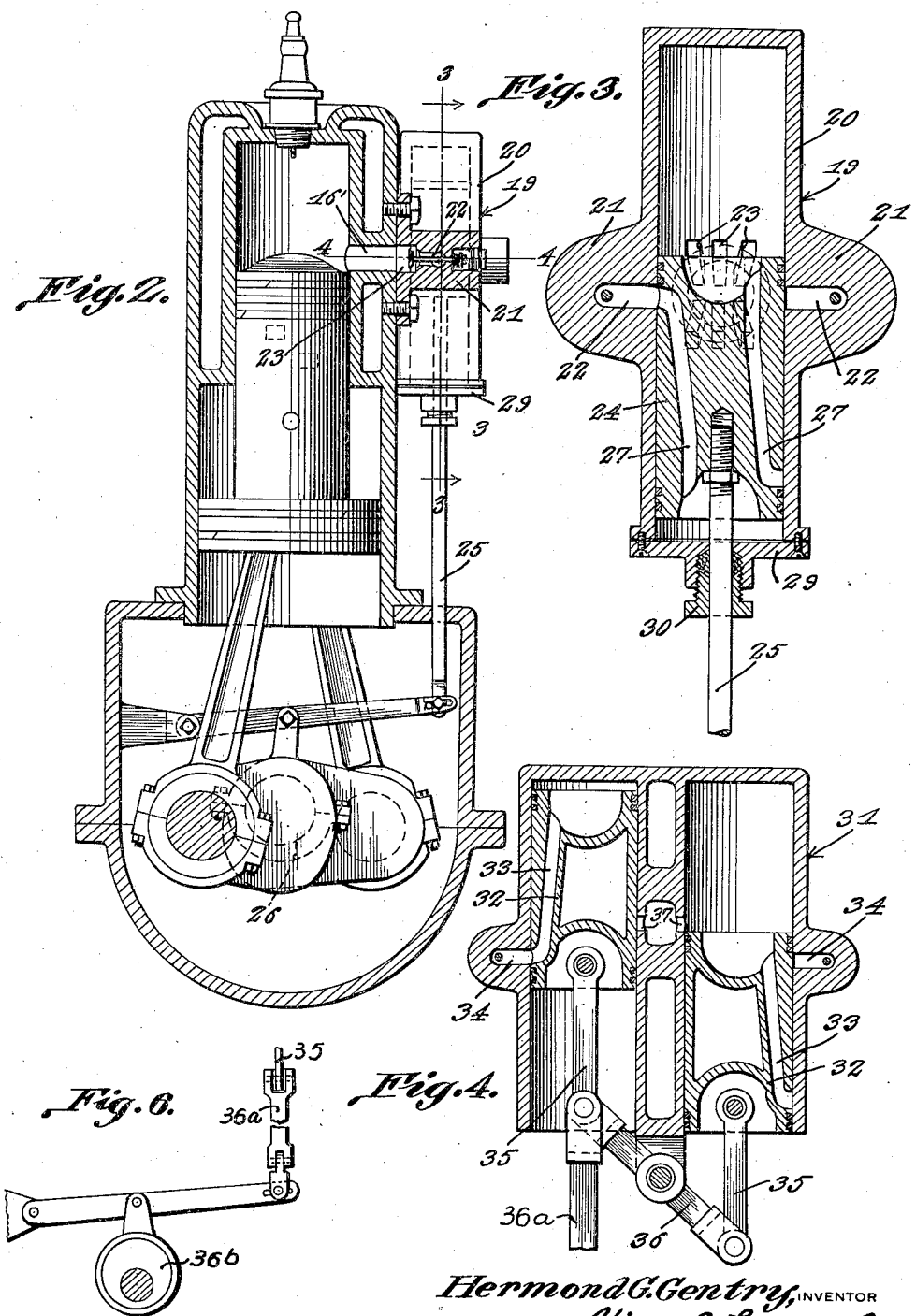
Hermond G. Gentry, INVENTOR
BY Victor J. Evans & Co.
ATTORNEYS Patented Nov. 8, 1938

2,136,293

UNITED STATES PATENT OFFICE 2,136,293

INTERNAL COMBUSTION ENGINE

Hermond G. Gentry, Lake Village, Ark.

Application November 23, 1936, Serial No. 112,418

1 Claim. (Cl. 123—59)

This invention relates to internal combustion engines primarily of the two cycle type, however, principles involved therein may be adapted to a Diesel type of engine.

The primary object of the invention is the provision of cylinder and piston constructions whereby the present practice of compressing fuel in the crank case is eliminated, permiting any type of crank case and lubricating system to be employed and further obviates the fuel from becoming mixed with lubricant as common in crank case compression type of engine.

Another object of the invention is the provision of compression chambers in the cylinders and the pistons of said cylinders acting to take in fuel and air within the compression chambers and compressing the same with means for delivering the fuel and air under compression from said compression chambers to the firing chambers of the cylinders for further compression and firing or igniting, whereby a very efficient and economical engine is provided and also wherein the incoming fuel and air in the cylinders under compression will rid said cylinders of exhaust or spent gases.

A further object of this invention is the provision of a pump or injector for forcing fuel and air into the cylinders after the pistons close the cylinders and the compression chambers and which acts as a supercharger to increase the efficiency and cheapness of operation of the engine and being of such a construction that it will supply fuel and air to a pair of cylinders of the engine.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 1 is a vertical sectional view illustrating an internal combustion engine constructed in accordance with my invention.

Figure 2 is a transverse sectional view illustrating a pump or injector applied to my engine to increase the efficiency and cheapness of operation thereof.

Figure 3 is a vertical sectional view, showing the pump or injector.

Figure 4 is a vertical sectional view illustrating a modified form of pump or injector.

Figure 5 is a fragmentary horizontal sectional view taken on the line 4—4 of Figure 2, showing the connection of the injector or pump to the engine.

Figure 6 is a detail view illustrating the eccentric and connection of the modified form illustrated in Fig. 4.

In adapting the principles of my invention to a two cycle type of engine, the cylinders thereof are grouped in pairs and to provide a clear illustration of the invention, there is shown in Figure 1 a pair of cylinders 1 cast in a block 2, the latter being mounted on a base 3 closed by a crank case 4 of any desired construction. The base 3 rotatably supports a crank shaft 5 and the pistons of said cylinders 1 are indicated generally by the character 6 and are connected to the cranks of the crank shaft 5 by connecting rods 7. In constructing the cylinders, the lower portions thereof are of an enlarged diameter over the upper portions to form compression chambers 8 and the pistons at their lower ends are provided with piston heads 9 operating in the compression chambers. Between the upper ends of the pistons 6 and the upper ends of the cylinders are formed the usual firing chambers 10. Spark plugs or equivalent igniting mediums 12 extend into the firing chambers. The cylinders at a point slightly above the compression chambers 8 are provided with exhaust ports 13 which ports are uncovered by the pistons 6 when said pistons reach their lowermost position so that the exhaust or spent gases may escape.

Formed in the block 2 are passages 14 employed for transferring compressed fuel or air from the compression chambers to the cylinders 1 or firing chambers thereof. The communication of the passages 14 with the cylinders is such that the pistons uncover said passages when the pistons reach substantially their lowermost positions. The other ends of the passages are placed in communication with the compression chambers 8 by means of passages 15 formed in the pistons when the latter near their uppermost positions.

Intake ports 16 are formed in the block 2 and communicate with the compression chambers. The intake ports have check valves 17 and when the engine is used without the fuel injector, which will be hereinafter more fully described, the intake ports are connected in any suitable way to a carbureter for furnishing to the compression chambers a mixture of fuel and air. However, when the fuel injector is used or when adapting the principles of this invention to a Diesel type engine the intake ports 16 will be in direct communication with the atmosphere. The fuel mixture is then directed directly into the cylinders of the engine through the intake port 16' provided for this purpose in the cylinders of the engine, or in case of the Diesel type engine by a regular Diesel injector engine pump.

For convenience in describing the operation of this engine, the cylinders 1 will be termed or known as cylinders A and B. In operation, as the piston in the cylinder A moves downwardly it creates a suction in the compression chamber 8 of said cylinder drawing therein fuel and air from the carbureter (not shown). The movement of the piston in cylinder A in an upward direction compresses the fuel and air until said piston nears the completion of its upward stroke when the passage 15 thereof communicates with one of the passages 14, transferring the compressed fuel and air to the cylinder B, the piston of said cylinder B then has reached substantially its lowermost position, uncovering said passage 14 and also the exhaust port 13 whereby the compressed fuel and air entering the cylinder B scavenges said cylinder B of spent gases and charges said cylinder B with fuel and air so that when the piston thereof moves upwardly the fuel and air will be further compressed and fired as usual in the principle of the two cycle engine. Deflectors 18 are provided on the upper ends of the pistons to prevent the incoming fuel and air from passing directly out of the exhaust ports during the scavenging of the cylinders. An engine operating on this principle will be useful in engines of small horsepower type primarily used for outboard motor boats and similar devices. However, when the engine is constructed with this principle in larger or heavy duty types and in order to obtain efficiency and economical operation an injector or pump of the character shown in the drawings should be employed and the cylinders are provided with intake ports 16'.

The injector or pump is designated generally by the character 19 and consists of a cylinder 20 having intermediate its ends offsets 21 in which are formed passages 22 and these passages are connected with the intake ports 16' of the engine. The cylinder 20 is also provided with groups of intake ports 23 connected in any well known manner to a carbureter (not shown), each group of ports being only uncovered by the piston 24 when the latter reaches substantially the end of its stroke in either direction. It is to be understood that one of the passages 22 communicates with one of the intake ports 16' of the engine described while the other passage 22 communicates with the other intake port 16' of the engine. The cylinder 20 is mounted on the block 1 in any suitable manner, as shown in Figure 5, and the piston 24 has a connecting rod 25 operatively connected with a cam or eccentric 26 formed on the crank shaft 5 whereby the piston 24 is reciprocated in the cylinder 20. Companion passages 27 are formed in the piston 24, each opening outwardly through an end of the piston and also through one side of the piston. However, it is to be understood that one of the passages 27 opens outwardly through one end of the piston while the other passage 27 opens outwardly through the other end of the piston and further it is to be noted that one passage 27 opens outwardly through one side of the piston and the other passage 27 opens outwardly through the opposite side of the piston. The passages 27 where they open outwardly through the sides of the pistons will be in close proximity to the end of the piston. One end of the cylinder 20 is closed by a removable head 29 having a stuffing box 30 through which the connecting rod 25 operates. The removable head 29 permits the assembly of the piston 24 in the cylinder 20. The piston 24 reciprocates in the cylinder 20 and is timed with the reciprocation of the pistons 6 of the engine so that as the piston 24 moves downwardly in the cylinder 20, suction is created in the upper end of the cylinder and as the piston nears its lowermost position the upper group of intake ports 23 are uncovered, allowing fuel and air to be drawn in so that during the upstroke of the piston 24 said fuel and air is compressed in the upper portion of the chamber until the piston nears its uppermost position when one of the passages 27 communicates with one of the passages 22 permitting the compressed fuel to pass under considerable pressure into the cylinder of the engine which is in communication with the said passage 22. Further, it is to be noted that the same operation occurs in the lower end of the cylinder to draw fuel therein when the piston moves upwardly and to compress the fuel and air when the piston moves downwardly, thereby making the pump or injector double acting so that fuel and air will be supplied to a pair of cylinders of the engine alternatingly under compression. One end of the piston 24 is cupped, providing a larger space for compressing the fuel and air, said air when entering cools the piston and thereby has its temperature raised before being forced into the combustion chambers.

The injector described is of a single cylinder type, however, the same principle may be employed in a pump or injector 31 of a two cylinder type, this being clearly shown in Figure 4. Each cylinder of the pump or injector 31 has a piston 32 and in this instance each piston has a single passage 33 similar to one of the passages 27. The cylinders of the pump or injector 31 have the outlet ports 34 connected to the intake ports 16' of the engine shown in Figure 1. The connecting rods of the pistons are indicated by the character 35 and one is connected to the eccentric on the crank shaft of the engine, while the other is connected to a pivotally mounted lever 36. The pivotally mounted lever 36 is connected to the connecting rod 36a which is connected to the eccentric 36b of the crank shaft of the engine so that the pistons reciprocate in opposite directions. The intake ports of the cylinders of the pump or injector 31 are indicated by the character 37 and they are in turn connected to a carbureter (not shown). The principle of operation of the pump or injector 31 is similar to the pump or injector 19 wherein fuel will be taken in and compressed and alternatingly supplied to the cylinders of the engine. The pump or injector 31 need not have the cylinders closed at the lower end which eliminates the use of packing glands or stuffing boxes and the cylinders may be in direct communication with the crank case of the engine so that lubricant from the latter may reach the pistons of the cylinders of the pump or injector 31.

Having described the invention, I claim:

An injector for a two cycle internal combustion engine comprising a pair of pump cylinders having intake ports, a pair of power cylinders, pistons reciprocating in said cylinders and opening and closing the intake ports, said cylinders each having an outlet port disposed adjacent an intake port and passages from said pump cylinders and communicating with an intake port of an adjacent power cylinder which is disposed adjacent the outlet port thereof and the piston of each cylinder adapted to close the outlet port therein communicating with the intake port of the adjacent power cylinder when the piston in the adjacent cylinder nears the completion of its compression stroke, and each piston formed with a passage having an end opening outwardly through the head thereof into its respective cylinder and the other end opening through one side and adapted to register with the outlet port as the piston nears the completion of its compression stroke for forcing the compressed fuel into the cylinders of the engine.

HERMOND G. GENTRY.